United States Patent Office 3,767,645
Patented Oct. 23, 1973

3,767,645
ACYLTHIOACETYL PENICILLINS
Uwe Treuner, Regensburg, and Hermann Breuer, Burgweinting, Germany, assignors to E. R. Squibb & Sons, Inc., Princeton, N.J.
No Drawing. Filed Sept. 14, 1971, Ser. No. 180,494
Int. Cl. C07d 99/16
U.S. Cl. 260—239.1
9 Claims

ABSTRACT OF THE DISCLOSURE

Acylthioacetylpenicillins of the general formula

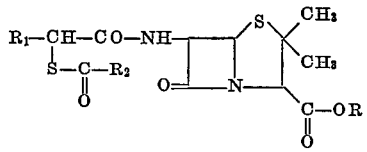

wherein R is hydrogen, lower alkyl, aralkyl, tri(lower alkyl)silyl, a salt forming ion or the group

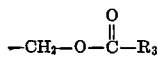

$R_1$ is hydrogen, lower alkyl, cycloalkyl, aralkyl, aryl or certain heterocyclic groups; $R_2$ is lower alkyl, cycloalkyl, aryl or certain heterocyclic groups; and $R_3$ is lower alkyl, aryl or aralkyl, are useful as antibacterial agents.

SUMMARY OF THE INVENTION

This invention relates to new thiocarbonylthioacetylpenicillins of the formula (I)

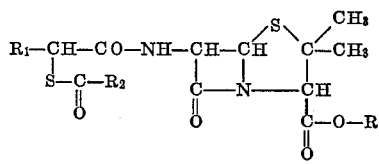

R represents hydrogen, lower alkyl, aralkyl, tri(lower alkyl)silyl, a salt forming ion or the group

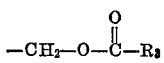

$R_1$ represents hydrogen, aryl, lower alkyl, saturated and unsaturated cycloalkyl, aralkyl or certain heterocyclic groups; $R_2$ represents lower alkyl, cycloalkyl, aryl or certain heterocyclic groups; $R_3$ represents lower alkyl, aryl or aralkyl.

The preferred members within each group are as follows: R is hydrogen, lower alkyl, alkali metal, trimethylsilyl or

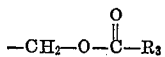

especially hydrogen, methyl, pivaloyloxy, sodium or potassium; $R_1$ is hydrogen, phenyl, thienyl, furyl, oxazolyl, isoxazolyl or thiazolyl, especially phenyl, $R_2$ is lower alkyl, especially methyl or ethyl, or phenyl; $R_3$ is lower alkyl, preferably methyl or t-butyl.

DETAILED DESCRIPTION OF THE INVENTION

The various groups represented by the symbols have the meanings defined below and these definitions are retained throughout this specification.

The lower alkyl groups are straight or branched chain hydrocarbon radicals having one to eight carbons in the chain, for example, methyl, ethyl, propyl, isopropyl, butyl, isobutyl, t-butyl, amyl or the like.

The cycloalkyl groups include saturated and unsaturated cyclic alkyl groups having three to seven carbon atoms and up to two double bonds, for example, cyclopropyl, cyclobutyl, cyclopentyl, cyclohexyl, cycloheptyl, cyclobutenyl, cyclopentenyl, cyclohexenyl, cyclohexadienyl and the like. The five and six carbon members are preferred and among the unsaturated members the 1,4-cyclohexadienyl group is preferred.

The aryl groups are monocyclic carbocyclic aryl groups including simply substituted members. By way of illustration, this includes the phenyl ring and simply substituted phenyl containing one to three substituents (preferably only one) such as the halogens (chlorine and bromine being preferred), lower alkyl groups such as those defined above, lower alkoxy groups, (i.e., lower alkyl groups of the type defined above attached to an oxygen), hydroxy, cyano, carboxy, nitro, amino, di-lower alkylamino and the like. In the case of the last six named substituents there is preferably only one, especially in the para position of the phenyl. Illustrative are phenyl, o-, m- and p-chlorophenyl, o-, m- and p-bromophenyl, p-tolyl, p-methoxyphenyl, 3,4,5-trimethoxyphenyl, p-hydroxyphenyl, p-carboxyphenyl and the like.

The aralkyl groups include a monocyclic carbocyclic aryl group attached to a lower alkyl group, both as defined above. Illustrative are benzyl, o-, m- or p-chlorobenzyl, o-, m- or p-bromobenzyl, o-, m- or p-methylbenzyl, phenethyl, p-chlorophenethyl, 3,5-diethylbenzyl, 3,4,5-trichlorobenzyl and the like.

The heterocyclic groups represented by $R_1$ and $R_2$ are monocyclic heterocyclic radicals (having 5 or 6 atoms exclusive of hydrogen which are carbon, sulfur, nitrogen and oxygen, no more than two being other than carbon), including thienyl, furyl, oxazolyl, isoxazolyl and thiazolyl, as well as these heterocyclics with the substituents halo, lower alkyl (particularly methyl and ethyl), lower alkoxy (particularly methoxy and ethoxy) or phenyl.

The salt forming ions represented by R may be metal ions, e.g., aluminum, alkali metal ions such as sodium or potassium, alkaline earth metal ions such as calcium or magnesium, or an amine salt ion, of which a number are known for this purpose, for example, dibenzylamine, N,N - dibenzylethylenediamine, methylamine, triethylamine, procaine, N-ethylpiperidine, etc.

The new acylthioacetylpenicillins of this invention are produced by reacting 6-aminopenicillanic acid or a derivative thereof, e.g., a salt or ester, of the formula (II)

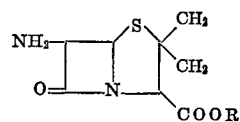

with an acylthioacetic acid of the formula (III)

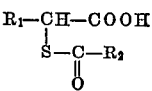

or an activated derivative of the former (II). The symbols have the meanings already defined.

The activated derivatives referred to include, for example, the reaction product with an anhydride forming reagent such as ethylchloroformate, benzoyl chloride, pivaloyl chloride, etc., or with bis-imidazolecarbonyl, dicyclohexylcarbodiimide, p-nitrophenol or the like.

The reaction between 6-aminopenicillanic acid and the acylthioacetic acid may be effected, for example, by dissolving or suspending the latter in an inert organic solvent such as chloroform, methylene chloride, dioxane, benzene or the like, and adding, at about room temperature or below, about an equimolar amount of an anhydride forming reagent, e.g., ethyl chloroformate, benzoylchloride or the like, or other activating compound such as dicyclohexyl-carbodiimide, along with a salt forming organic base, such as triethylamine, pyridine or the like, followed, after an interval by the addition of 6-aminopenicillanic acid or derivative. The product of the reaction is then isolated by conventional procedures, e.g., by concentration or evaporation of the solvent.

When R is the acyloxymethyl group

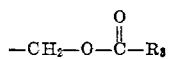

this group may be introduced onto the 6-aminopenicillanic acid moiety prior to the reaction with the acylthioacetic acid or halide by treatment with one to two moles of a halomethyl ester of the formula (IV)     hal—CH$_2$OCOR$_3$ wherein hal is halogen, preferably chlorine or bromine, in an inert organic solvent such as dimethylformamide, acetone, dioxane, benzene or the like, at about ambient temperature or below.

As an alternative, a product of Formula I may be produced by reacting a salt, e.g., an alkali metal salt, of the formula (V) 

with a compound of the formula (VI) 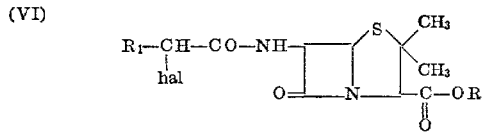

or derivative thereof. Me represents a metal, hal is halogen, preferably chlorine or bromine and R and R$_1$ are the same as above.

The acylthioacetic acid of Formula III may be produced according to the following general method:

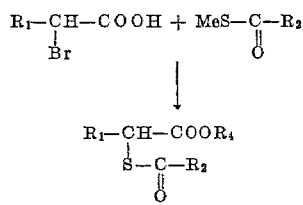

(wherein R$_4$ is hydrogen or lower alkyl)

by a procedure analogous to Bonner, Jour. Org. Chem. 33, 1831 (1968).

The symbols have the meanings already defined.

Further process details are also provided in the illustrative examples.

Certain of the compounds of this invention may exist in different optically active forms. The various stereoisomeric forms as well as the racemic mixtures are within the scope of the invention.

The compounds of this invention have a broad spectrum of antibacterial activity against both gram positive and gram negative organisms such as *Staphylococcus aureus, Salmonella schottmuelleri, Pseudomonas aeruginosa, Proteus vulgaris, Escherichia coli* and *Streptococcus pyogenes*. They may be used as antibacterial agents in a prophylatic manner, e.g., in cleaning or disinfecting compositions, or otherwise to combat infections due to organisms such as those named above, and in general may be utilized in a manner similar to penicillin G and other penicillins. For example, a compound of Formula I or a physiologically acceptable salt thereof may be used in various animal species in an amount of about 1 to 200 mg./kg., daily, orally or parenterally, in single or two to four divided doses to treat infections of bacterial origin, e.g., 5.0 mg./kg. in mice.

Oral forms give prompt high blood levels which are maintained for relatively long periods.

Up to about 600 mg. of a compound of Formula I or a physiologically acceptable salt thereof may be incorporated in an oral dosage form such as tablets, capsules or elixirs or in an injectable form in a sterile aqueous vehicle prepared according to conventional pharmaceutical practice.

They may also be used in cleaning or disinfecting compositions, e.g., for cleaning barns or dairy equipment, at a concentration of about 0.01 to 1% by weight of such compounds admixed with, suspended or dissolved in conventional inert dry or aqueous carriers for application by washing or spraying. They are also useful as nutritional supplements in animal feeds.

The following examples are illustrative of the invention. All temperatures are on the centigrade scale. Additional variations may be produced in the same manner by appropriate substitution in the starting material.

Example 1

To 5.6 gm. of 2-(acetylthio)-2-phenylacetic acid in 50 ml. of absolute methylene chloride are added 4.12 gm. (20 mmol.) of dicyclohexylcarbodiimide in 20 ml. of methylene chloride and stirred for one half hour at 0° under nitrogen. Then 5.1 gm. of 6-aminopenicillanic acid trimethylsilyl ester in 10 ml. of methylene chloride are added dropwise and stirred for 12 hours at 0–5°. The reaction mixture is stirred for one more hour at room temperature. This is then filtered with suction under a nitrogen atmosphere to separate the dicyclohexylurea which has formed. The filtrate is evaporated to dryness in vacuo. There remains a viscous pink mass which crystallizes upon trituration with ether. The product is identified by elemental analysis, NMR and IR as the trimethylsilyl ester of DL-6-[2-(acetylthio)-2-phenylacetamido] penicillanic acid.

Treatment of the ester with water gives the free acid. The potassium salt is obtained by treatment of the free acid with potassium ethylhexanoate. The sodium salt is formed similarly.

The following additional products having the formula in the right hand side of the table are obtained by the procedure of Example 1 from starting materials having the formula in the left hand part of the table:

or monounsaturated or diunsaturated cycloalkyl of 3 to 7 carbons, lower alkyl, $R_4$-phenyl-lower alkyl, $R_4$-phenyl

TABLE $$R_1-CH-COOH$$
$$\quad |$$
$$S-C-R_2$$
$$\quad \|$$
$$\quad O$$

$$R_1-CH-CO-NH-\underset{O=}{\overset{S}{\underset{|}{\bigsqcup}}}\overset{CH_3}{\underset{CH_3}{\overset{|}{\underset{|}{\bigsqcup}}}}$$
$$\quad | \qquad\qquad\qquad N\quad C-OR$$
$$S-C-R_2 \qquad\qquad\qquad\qquad \|$$
$$\quad \|\qquad\qquad\qquad\qquad\qquad\qquad O$$

| Example | $R_1$ | $R_2$ | R | $R_1$ | $R_2$ |
|---|---|---|---|---|---|
| 2 | H | $CH_3$ | $CH_3$ | H | $CH_3$ |
| 3 | $CH_3$ | $C_2H_5$ | $C_2H_5$ | $CH_3$ | $C_2H_5$ |
| 4 | $C_3H_7$ | $C_2H_5$ | $CH_3$ | $C_3H_7$ | $C_2H_5$ |
| 5 | $C_6H_5CH_2$ | $C_6H_5$ | $-CH_2O\overset{O}{\overset{\|}{C}}-CH(CH_3)_2$ | $C_6H_5CH_2$ | $C_6H_5$ |
| 6 | 4-$ClC_6H_4$ | H | $-CH_2O\overset{O}{\overset{\|}{C}}-C_6H_5$ | 4-$ClC_6H_4$ | H |
| 7 | 3,4-$(CH_3O)_2C_6H_3$ | $C_2H_5$ | $C_2H_5$ | 3,4-$(CH_3O)_2C_6H_3$ | $C_2H_5$ |
| 8 | 3,4,5-$(CH_3O)_3C_6H_2$ | $C_2H_5$ | $C_2H_5$ | 3,4,5-$(CH_3O)_3C_6H_2$ | $C_2H_5$ |
| 9 | 4-$CH_3C_6H_4$ | thienyl | Na | 4-$CH_3C_6H_4$ | furyl |
| 10 | 3,4-$(Br)_2C_6H_3CH_2$ | H | $C_2H_5$ | 3,4-$(Br)_2C_6H_3CH_2$ | H |
| 11 | 2,4-$(Cl)_2C_6H_3$ | $C_2H_5$ | $C_2H_5$ | 2,4-$(Cl)_2C_6H_3$ | $C_2H_5$ |
| 12 | $C_6H_5$-oxazolyl-$CH_3$ | $C_2H_5$ | $C_2H_5$ | $C_6H_5$-oxazolyl-$CH_3$ | $C_2H_5$ |
| 13 | thienyl | $C_2H_5$ | $C_2H_5$ | thienyl | $C_2H_5$ |
| 14 | furyl | furyl | $C_6H_5CH_2$ | furyl | furyl |
| 15 | $C_2H_5$ | $C_6H_5$ | $-CH_2O-\overset{O}{\overset{\|}{C}}-CH(CH_3)_2$ | $C_6H_5$ | $C_6H_5$ |
| 16 | $C_6H_5$ | $C_6H_5$ | $-N(C_2H_5)_3$ | $C_6H_5$ | $C_6H_5$ |
| 17 | $C_6H_5$ | $CH_3$ | Na | $C_6H_5$ | $CH_3$ |
| 18 | phenyl | $CH_3$ | H | phenyl | $CH_3$ |
| 19 | cyclopentenyl | $C_6H_5$ | H | cyclopentenyl | $C_6H_5$ |

What is claimed is:

1. A compound of the formula

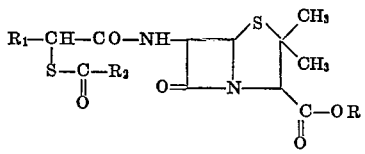

wherein R is hydrogen, lower alkyl, tri(lower alkyl)silyl,

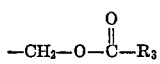

or a salt forming ion of the group consisting of aluminum, alkali metal, alkaline earth metal, dibenzylamine, N,N-dibenzylethylenediamine, methylamine, triethylamine, procaine and N-ethylpiperidine; $R_1$ is hydrogen, saturated or monounsaturated or diunsaturated cycloalkyl of 3 to 7 carbons, lower alkyl, $R_4$-phenyl-lower alkyl, $R_4$-phenyl or a monocyclic heterocyclic selected from the group consisting of thienyl, furyl, oxazolyl and thiazolyl and halo, lower alkyl, lower alkoxy or phenyl substituted members of said heterocyclics, $R_2$ is lower alkyl, cycloalkyl of 3 to 7 carbons, $R_4$-phenyl or a heterocyclic of the aforementioned group of heterocyclics $R_3$ is lower alkyl, $R_4$-phenyl or $R_4$-phenyl-lower alkyl and $R_4$ is hydrogen, halogen, lower alkyl, lower alkoxy, hydroxy, cyano, nitro or amino.

2. A compound as in claim 1 wherein $R_1$ is phenyl.

3. A compound as in claim 2 wherein $R_2$ is lower alkyl and R is hydrogen.

4. Alkali metal salt of a compound of claim 2.

5. A compound as in claim 2 wherein R is hydrogen and $R_2$ is phenyl.

6. A compound as in claim 3 wherein the lower alkyl group is methyl.

7. Alkali metal salt of the compound of claim 5.
8. Alkali metal salt of the compound of claim 6.
9. A compound as in claim 1 wherein R is hydrogen, lower alkyl, alkali metal, trimethylsilyl or

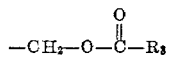

$R_1$ is hydrogen, phenyl, thienyl, furyl, oxazolyl, isoxazolyl or thiazolyl, $R_2$ is lower alkyl or phenyl and $R_3$ is lower alkyl.

References Cited
UNITED STATES PATENTS
3,574,190  4/1971  Honkanen et al. ____ 260—239.1

NICHALAS S. RIZZO, Primary Examiner

U.S. Cl. X.R.
424—271

UNITED STATES PATENT OFFICE
CERTIFICATE OF CORRECTION

Patent No. 3767645    Dated October 23, 1973

Inventor(s) Uwe Treuner et al.

It is certified that error appears in the above-identified patent and that said Letters Patent are hereby corrected as shown below:

Column 2, line 25 after bromophenyl add -- 3,4-dichlorophenyl, 3,5-dibromophenyl, o-, m- and --.

Signed and sealed this 17th day of December 1974.

(SEAL)
Attest:

McCOY M. GIBSON JR.
Attesting Officer

C. MARSHALL DANN
Commissioner of Patents

Disclaimer 3,767,645.—*Uwe Treuner*, Regensburg, and *Hermann Breuer*, Burgweinting, Germany. ACYLTHIOACETYL PENICILLINS. Patent dated Oct. 23, 1973. Disclaimer filed Jan. 8, 1975, by the assignee, *E. R. Squibb & Sons, Inc.*

Hereby enters this disclaimer to claims 1 and 9 of said patent.

[*Official Gazette April 8, 1975.*]